(12) United States Patent
Fukui

(10) Patent No.: US 7,381,974 B2
(45) Date of Patent: Jun. 3, 2008

(54) RADIATION IMAGE STORAGE PANEL

(75) Inventor: Shinichiro Fukui, Ashigara-kami-gun (JP)

(73) Assignee: FUJIFILM Corporation, Tokyo (JP)

(*) Notice: Subject to any disclaimer, the term of this patent is extended or adjusted under 35 U.S.C. 154(b) by 301 days.

(21) Appl. No.: 11/370,978

(22) Filed: Mar. 9, 2006

(65) Prior Publication Data

US 2006/0202134 A1 Sep. 14, 2006

(30) Foreign Application Priority Data

Mar. 9, 2005 (JP) .............................. 2005-066026

(51) Int. Cl.
*H05B 33/00* (2006.01)

(52) U.S. Cl. .................................................. 250/484.4

(58) Field of Classification Search ............. 250/484.4, 250/226, 236, 585, 216, 234, 235, 559.02, 250/559.06, 586, 587, 588, 591, 584, 583, 250/582, 581, 580, 488.1, 487.1, 485.1, 483.1; 359/241, 243, 244, 240, 614

See application file for complete search history.

(56) References Cited

U.S. PATENT DOCUMENTS 5,665,962 A * 9/1997 Kimura ...................... 250/226

FOREIGN PATENT DOCUMENTS

JP 2004-132872 4/2004
JP 2004-177314 6/2004

\* cited by examiner

*Primary Examiner*—David P. Porta
*Assistant Examiner*—Kiho Kim
(74) *Attorney, Agent, or Firm*—Sughrue Mion, PLLC

(57) ABSTRACT

A radiation image storage panel has a phosphor layer containing an energy-storing phosphor, in which the storage panel has a surface showing an absorbance of 0.2 to 0.5 at the stimulating wavelength of the phosphor, and the phosphor layer contains the phosphor at a packing density of 3.0 $g/cm^3$ or more.

11 Claims, No Drawings

RADIATION IMAGE STORAGE PANEL

FIELD OF THE INVENTION

The present invention relates to a radiation image storage panel employable in a radiation image recording and reproducing method utilizing an energy-storing phosphor.

BACKGROUND OF THE INVENTION

When exposed to radiation such as X-rays, an energy-storing phosphor (e.g., stimulable phosphor, which gives off stimulated emission) absorbs and stores a portion of the radiation energy. The phosphor then emits stimulated emission according to the level of the stored energy when exposed to electromagnetic wave such as visible or infrared light (i.e., stimulating light). A radiation image recording and reproducing method utilizing the energy-storing phosphor has been widely employed in practice. In that method, a radiation image storage panel, which is a sheet comprising the energy-storing phosphor, is used. The method comprises the steps of: exposing the storage panel to radiation having passed through an object or having radiated from an object, so that radiation image information of the object is temporarily recorded in the panel; sequentially scanning the storage panel with stimulating light such as a laser beam to emit stimulated light; and photoelectrically detecting the emitted light to obtain electric image signals. The storage panel thus treated is subjected to a step for erasing radiation energy remaining therein, and then stored for the use in the next recording and reproducing procedure. Thus, the radiation image storage panel can be repeatedly used.

The radiation image storage panel (often referred to as energy-storing phosphor sheet) has a basic structure comprising a support and a phosphor layer provided thereon. However, if the phosphor layer is self-supporting, the support may be omitted. Further, a protective layer is generally provided on the free surface (surface not facing the support) of the phosphor layer so as to keep the phosphor layer from chemical deterioration or physical damage.

Various kinds of energy-storing phosphor layers are known. For example, the phosphor layer can comprise a binder and energy-storing phosphor particles dispersed therein, or otherwise can comprise agglomerate of an energy-storing phosphor without binder. The latter layer can be formed by a gas phase-accumulation method or by a firing method.

The radiation image recording and reproducing method (or radiation image forming method) has various advantages as described above. However, it is still desired that the radiation image storage panel used in the method have as high sensitivity as possible and, at the same time, give a reproduced radiation image of as high quality (in regard to sharpness and graininess) as possible.

JP-A-2004-132872 discloses a radiation image storage panel containing a pigment in the form of particles having a mean size of 0.1 to 1.2 μm. The pigment shows integrated absorbances (a) and (b) at the wavelength regions of 670 to 690 nm and 390 to 420 nm, respectively, under the condition of $0.80 \leq a/b \leq 3.00$.

JP-A-2004-177314 discloses another radiation image storage panel comprising a stimulable phosphor layer. The phosphor layer contains stimulable phosphor particles having a mean size of 3.0 μm or less and, in addition, pigment particles having a mean size of 1.2 μm or less in an amount of 0.0002 to 0.001 wt. % based on the amount of the stimulable phosphor. Both radiation image storage panels disclosed in the above-identified publications have object for improving quality, particularly, sharpness of the reproduced radiation image.

As described above, for the purpose of improving the sharpness of radiation image, it has been proposed and practically adopted to incorporate a colorant such as pigment into the phosphor layer of the radiation image storage panel. The radiation image storage panel capable of giving a radiation image of high sharpness is practically used in precise examination such as dental diagnosis and non-destructive inspection, as well as in the conventional radiography. In the precise examination, the storage panel is required to give a radiation image having both high sharpness and no imaging defects such as arcifacts. Even if there are some scratches on the panel surface, it is necessary for the scratches not to cause arcifacts on the image. In other words, the radiation image storage panel must be excellent in resistance to scratch Accordingly, it is desired to provide a radiation image storage panel not only giving high sharpness but also having excellent scratch resistance.

However, it is difficult to manufacture a radiation image storage panel having both excellent scratch resistance and high sharpness at the same time. When the surface of the storage panel is scratched, the phosphor layer in the scratched area is locally dented. Since the phosphor layer is thus rendered to have uneven thickness, arcifacts are liable to appear on the resultant reproduced image. For the reason, the higher sharpness the radiation image storage panel gives, the more likely the resultant reproduced image suffers arcifacts.

SUMMARY OF THE INVENTION

It is an object of the present invention to provide a radiation image storage panel having excellent resistance to scratch and giving a reproduced radiation image of high sharpness.

The applicant has studied the above-mentioned problem, and finally discovered that both excellent scratch resistance and high sharpness can be brought about at the same time if the absorbance of the panel surface and the packing density of the phosphor in the phosphor layer are controlled in combination in particular ranges. In the present invention, the packing density is increased, for example, by compressing the phosphor layer, to harden the phosphor layer so that the thickness of the phosphor layer can be changed little even if the panel surface is scratched and so that, even if the thickness is changed, the amount of stimulated emission can be less affected. In this way, even if the surface of the storage panel is scratched, the features of the present invention can effectively prevent arcifacts on the radiation image. Further, if a colorant is incorporated in an amount more than ever into the storage panel, the panel surface gives an increased absorbance at the stimulating wavelength (particularly, at the maximum stimulating wavelength) and thereby the stimulating light is effectively prevented from scattering so that high sharpness can be obtained though the phosphor is densely packed.

The present invention resides in a radiation image storage panel which comprises a phosphor layer containing an energy-storing phosphor, wherein the storage panel has a surface showing an absorbance of 0.2 to 0.5 at the stimulating wavelength of the phosphor, and the phosphor layer contains the phosphor therein at a packing density of 3.0 $g/cm^3$ or more.

In the present specification, "surface of the storage panel" or "panel surface" means a surface of the radiation image storage panel on the side onto which the stimulating light (reading light) is applied and from which the radiation image information is read out. Further, "stimulating wavelength" means a wavelength of the stimulating light used for reproducing a radiation image having been recorded and stored in the phosphor layer. The stimulating wavelength preferably corresponds to the wavelength giving the maximum peak in the excitation (secondary excitation) spectrum of the energy-storing phosphor such as a stimulable phosphor. The term "emission wavelength" means a wavelength which is included in the wavelength range giving the spectrum of a stimulated emission given off from the phosphor and which is used for reproducing the radiation image. The emission wavelength preferably corresponds to the wavelength giving the maximum peak in the stimulated emission spectrum.

The radiation image storage panel of the invention, in which the absorbance of panel surface and the packing density of phosphor in the phosphor layer are controlled in the particular ranges, not only gives a radiation image of the prominently higher sharpness than the sharpness of the conventional radiation images ever have, but also has excellent scratch resistance. Accordingly, the radiation image storage panel of the invention can be advantageously used in precise examination such as dental diagnosis and non-destructive inspection.

DETAILED DESCRIPTION OF THE INVENTION

Preferred embodiments of the radiation image storage panel according to the invention are as follows.

(1) The surface of the storage panel shows absorbances A and B at the stimulating wavelength and at the emission wavelength, respectively, under the condition that the ratio A/B is 4.0 or more, preferably 4.5 or more.

(2) The surface of the storage panel shows an absorbance of 0.25 to 0.5 at the stimulating wavelength, and the packing density of the phosphor in the phosphor layer is 3.3 g/cm$^3$ or more.

(3) At least one of layers constituting the storage panel including the phosphor layer contains a colorant, and the colorant is preferably an ultramarine pigment.

(4) A protective layer having a thickness of 1 to 20 μm is provided on the surface of the storage panel, that is on the phosphor layer.

(5) The energy-storing phosphor is in the form of particles having a median diameter of 1.5 to 6.0 μm.

(6) The phosphor layer has a thickness of 30 to 150 μm.

(7) The phosphor layer further is hardened by a hardening agent.

The radiation image storage panel of the invention is described below in more detail.

In the radiation image storage panel of the invention, the surface of the storage panel shows an absorbance of 0.2 to 0.5 at the stimulating wavelength of the energy-storing phosphor. Here, "surface of the storage panel" means a surface of the radiation image storage panel on the side onto which stimulating light (reading light) is applied and from which the radiation image information is read out. Thus, the surface of the storage panel generally is a surface of the phosphor layer. If the phosphor layer is covered with an additional layer such as a protective layer, the surface of the storage panel means a surface of the additional layer such as a protective layer. As described later, the absorbance of the panel surface can be measured by means of a spectrophotometer (U-3310, manufactured by HITACHI, Ltd.) equipped with an integrating sphere of 150 φ (manufactured by HITACHI, Ltd.). In the measurement, the absorbance of the panel surface is determined by the use of an alumina-made white as a reference. The absorbance of the panel surface at the stimulating wavelength preferably is in the range of 0.25 to 0.5.

The absorbance of the panel surface measured at the stimulating wavelength of the energy-storing phosphor (absorbance A) and that measured at the emission wave length of the energy-storing phosphor (absorbance B) preferably are in a ratio A/B of 4.0 or more. The ratio A/B more preferably is 4.5 or more. The higher ratio means the storage panel preferably absorbs the stimulated emission as little as possible in consideration of sensitivity and image quality such as sharpness.

Further, the absorbance of the panel surface measured at the stimulating wavelength (absorbance A) and the absorbance of the opposite-side panel surface measured at the same wavelength (absorbance C) are preferably in a ratio A/C of 0.8 to 2.0. Since the phosphor layer is generally formed on a support, the "opposite-side" means the side on which the support is provided. In the invention, the phosphor layer preferably contains a colorant such as pigment so as to make the absorbance in the above-identified range. The colorant is preferably dispersed in the phosphor layer as evenly as possible, and hence the ratio A/C preferably is in the above-identified range.

In the radiation image storage panel of the invention, the packing density of the phosphor in the phosphor layer is 3.0 g/cm$^3$ or more. The packing density more preferably is 3.3 g/cm$^3$ or more. The packing density cannot be not larger than the density of the phosphor itself.

The radiation image storage panel of the invention can be manufactured, for example, in the following manner.

The support generally is a soft resin sheet or film having a thickness of 50 μm to 1 mm. The support may be transparent, may contain light-reflecting material (e.g., particles of alumina, titanium dioxide and barium sulfate) or voids for reflecting the stimulating light or the emission, or may contain light-absorbing material (carbon black) for absorbing the stimulating light or the emission. Examples of the resin material employable for the support include polyethylene terephthalate, polyethylene naphthalate, aramide resin, and polyimide resin. For improving the sharpness of the resultant reproduced image, fine concaves and convexes may be formed on the phosphor layer-side surface of the support (or on the phosphor layer-side surface of an auxiliary layer, if it is provided). The support may be a sheet of metal, ceramics or glass, if desired.

For increasing the adhesion between the support and the phosphor layer, an adhesive layer of polyester resin or acrylic resin can be provided as an auxiliary layer. Further, an anti-static electroconductive layer of the above-mentioned resin and electroconductive particles dispersed therein can be provided between the support and the phosphor layer.

On the support (or on the auxiliary layer), the phosphor layer comprising a binder and energy-storing phosphor particles is provided. The energy-storing phosphor preferably is a stimulable phosphor giving off stimulated emission in the wavelength region of 300 to 500 nm when exposed to the stimulating light in the wavelength region of 400 to 900 nm. Preferred examples of the stimulable phosphors include europium or cerium activated alkaline earth metal halide stimulable phosphors [e.g., BaFBr:Eu and BaF(Br, I):Eu] and cerium activated rare earth oxyhalide phosphors.

Particularly preferred is a rare earth activated alkaline earth metal fluoride halide stimulable phosphor represented by the formula (I):

$$M^{II}FX:zLn \qquad (I)$$

in which $M^{II}$ is at least one alkaline earth metal selected from the group consisting of Ba, Sr and Ca; Ln is at least one rare earth element selected from the group consisting of Ce, Pr, Sm, Eu, Tb, Dy, Ho, Nd, Er, Tm and Yb; X is at least one halogen selected from the group consisting of Cl, Br and I; and z is a number satisfying the condition of $0 < z \leq 0.2$.

In the formula (I), $M^{II}$ preferably comprises Ba more than half of the total amount of $M^{II}$, and Ln is preferably Eu or Ce. The $M^{II}FX$ in the formula (I) represents a matrix crystal structure of BaFX type, and it by no means indicates stoichiometrical composition of the phosphor though appearing to show F:X=1:1. It is generally preferred that the BaFX type crystal have many $F^+$ ($X^-$) centers corresponding to vacant lattice points of $X^-$ ions since they increase the efficiency of stimulated emission in the wavelength region of 600 to 700 nm. In that case, F is often slightly in excess of X.

Although omitted from the formula (I), one or more additives such as bA, $wN^I$, $xN^{II}$ and $yN^{III}$ may be incorporated into the phosphor of the formula (I), if needed. In the above, A stands for a metal oxide such as $Al_2O_3$, $SiO_2$ or $ZrO_2$. In order to prevent $M^{II}FX$ particles from sintering, the metal oxide preferably has low reactivity with $M^{II}FX$ and the primary particles of the oxide are preferably super-fine particles of 0.1 μm or less diameter. In the above, $N^I$ is a compound of at least one alkali metal selected from the group consisting of Li, Na, K, Rb and Cs; $N^{II}$ is a compound of alkaline earth metal(s) Mg and/or Be; and $N^{III}$ is a compound of at least one trivalent metal selected from the group consisting of Al, Ga, In, Tl, Sc, Y, La, Gd and Lu. The metal compounds are preferably halides, but are not restricted to them.

In the above, b, w, x and y represent amounts of the additives incorporated into the starting materials, provided that the amount of $M^{II}FX$ is assumed to be 1 mol. They are numbers satisfying the conditions of $0 \leq b \leq 0.5$, $0 \leq w \leq 2$, $0 \leq x \leq 0.3$ and $0 \leq y \leq 0.3$, respectively. These numbers by no means represent the contents in the resultant phosphor because the additives often decrease during the steps of firing and washing performed thereafter. Some additives remain in the resultant phosphor as they are added to the starting materials, but the others react with $M^{II}FX$ or are captured in the matrix.

In addition, the phosphor of the formula (I) may further comprise, if needed, Zn and Cd compounds; metal oxides such as $TiO_2$, BeO, MgO, CaO, SrO, BaO, ZnO, $Y_2O_3$, $La_2O_3$, $In_2O_3$, $GeO_2$, $SnO_2$, $Nb_2O_5$, $Ta_2O_5$ and $ThO_2$; Zr and Sc compounds; B compounds; As and Si compounds; tetrafluoroborate compounds; hexafluoro compounds such as monovalent or divalent salts of hexafluorosilicic acid, hexafluorotitanic acid and hexafluorozirconic acid; or compounds of transition metals such as V, Cr, Mn, Fe, Co and Ni. The phosphor usable in the invention is not restricted to the above, and any phosphor that can be essentially regarded as rare earth activated alkaline earth metal fluoride halide stimulable phosphor can be used.

The rare earth activated alkaline earth metal fluoride halide stimulable phosphor represented by the formula (I) is normally in the form of particles having aspect ratios of 1.0 to 5.0. The particles of the energy-storing phosphor in the invention preferably have a median diameter of 1.5 to 6.0 μm and aspect ratios of preferably 1.0 to 2.0 (more preferably 1.0 to 1.5). In the size distribution of them, the σ/Dm (in which σ represents the standard deviation) is preferably 50% or less (more preferably 40% or less). The shape of the particle is rectangular parallelepiped, regular hexahedron, regular octahedron, tetradecahedron, intermediate polyhedron thereof, or irregular shape. Among them, tetradecahedron is preferred.

The phosphor usable in the invention is not restricted to the above stimulable phosphor represented by the formula (I).

In forming the phosphor layer, the energy-storing phosphor particles and a binder are dispersed or dissolved in an appropriate organic solvent to prepare a phosphor dispersion. The ratio between the binder and the phosphor in the dispersion is generally in the range of 1:1 to 1:100 by weight, preferably 1:10 to 1:50 by weight.

As the binder for dispersing and supporting the phosphor particles, various resin materials are generally known. Examples of the binder material include natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol, linear polyester, and thermoplastic elastomers. These may be crosslinked with a crosslinking agent.

Examples of the solvents employable in the preparation of the phosphor dispersion include lower aliphatic alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower aliphatic alcohols with lower aliphatic acids such as methyl acetate, ethyl acetate and butyl acetate; ethers such as dioxane, ethylene glycol monoethyl ether, ethylene glycol monomethyl ether and tetrahydrofuran; and mixtures thereof.

In order to increase the absorbance of the panel surface, the phosphor dispersion preferably contains a colorant. The colorant preferably does not absorb the stimulated emission but absorbs the stimulating light as much as possible so that the absorbance can satisfy the aforementioned condition. The colorant preferably is pigment. The pigment employable for the invention may be either an organic or inorganic pigment. Examples of the pigments include perylene pigments, quinacridone pigments, bisbenzimidazole pigments, aromatic poly-condensed cyclic compounds, azo pigments, disazo pigments, and phthalocyanine pigments.

Examples of commercially available organic pigments usable in the invention include ZAPON FAST BLUE 3G (available from Hoechst AG), ESTROL BRILL BLUE N-3RL (available from Sumitomo Chemical Co., Ltd.), SUMIACRYL BLUE F-GSL (available from Sumitomo Chemical Co., Ltd.), D & C BLUE No. 1 (available from National Aniline Div. Allied Chemical & Dye Corp.), SPIRIT BLUE (available from Hodogaya Chemical Co., Ltd.), OIL BLUE No. 603 (available from Orient Chemical Industries, Ltd.), KITON BLUE A (available from Ciba-Geigy), AIZEN CATHILON BLUE GLH (available from Hodogaya Chemical Co., Ltd.), LAKE BLUE A, F, H (available from Kyowa Sangyo Co., Ltd.), RODALINE BLUE 6GX (available from Kyowa Sangyo Co., Ltd.), PRIMOCYANINE 6GX (available from Inabata & Co., Ltd.), BRILLACID GREEN 6BH (available from Hodogaya Chemical Co., Ltd.), CYANINE BLUE BNRS (available from Toyo Ink Mfg., Co., Ltd.), and LIONOL BLUE SL (available from Toyo Ink Mfg., Co., Ltd.). Examples of inorganic pigments employ-able in the invention include ultramarine, cobalt blue, cerulean blue, chromium oxide, and $TiO_2$—ZnO—CoO—NiO pigment.

If the energy-storing phosphor is a rare earth activated alkaline earth metal fluoride halide stimulable phosphor represented by the aforementioned formula (I), preferred blue pigments are ultramarine (absorption wavelength: 500 to 700 nm), copper phthalocyanine blue (absorption wavelength: 520 to 800 nm), prussian blue (absorption wavelength: 550 to 800 nm), cobalt blue (absorption wavelength: 540 to 700 nm) and dioxane violet (absorption wavelength: 490 to 670 nm), in consideration of the stimulating wavelength of the phosphor. Particularly, the ultramarine pigment is preferred.

Preferably, the phosphor dispersion further contains a hardening agent (such as isocyanate) to harden the phosphor layer. In addition, the phosphor dispersion can furthermore contain various additives such as a dispersing agent to assist the phosphor particles in dispersing in the binder solution, a plasticizer for enhancing the bonding between the binder and the phosphor particles, an anti-yellowing agent for preventing the layer from undesirable coloring, and a crosslinking agent.

The prepared phosphor dispersion is then evenly spread to coat a surface of the support by a conventional means such as a doctor blade, a roll coater or a knife coater, and dried to form the energy-storing phosphor layer. The thickness of the phosphor layer can be adjusted according to various conditions such as characteristics of the desired storage panel, properties of the phosphor, and the mixing ratio between the binder and the phosphor, but is generally in the range of 20 μm to 1 mm, preferably in the range of 50 to 500 μm, more preferably in the range of 30 to 150 μm.

Further, the formed phosphor layer is preferably compressed by means of, for example, a calendering machine, and thereby the phosphor particles can be closely packed in the phosphor layer and the phosphor layer can be made thinner.

The energy-storing phosphor layer does not always need to be a single layer, and may consist of two or more sub-layers. In that case, the sub-layers may have different composition. For example, they may differ in the phosphor in regard to the composition or the particle size, or may differ in the ratio between the phosphor and the binder. In other words, the sub-layers can be optimally designed so that the emission characteristics of the phosphor layer may suit the use of the storage panel or so that suitable scattering or absorption characteristics may be obtained. Further, it is not necessary to form the phosphor layer directly on the support. For example, the phosphor layer beforehand formed on another substrate (temporary support) may be peeled off and then fixed on the support with an adhesive.

On the energy-storing phosphor layer, a protective layer is preferably provided so as to enhance the scratch resistance, to ensure good handling of the storage panel in transportation and to avoid deterioration. The protective layer is preferably transparent so as not to prevent the stimulating light from coming in and/or not to prevent the emission from coming out. Further, for protecting the storage panel from chemical deterioration and physical damage, the protective layer is preferably chemically stable, physically strong, and of high moisture proof.

The protective layer can be provided by coating the phosphor layer with a solution in which a transparent organic polymer (e.g., cellulose derivatives, polymethyl methacrylate, fluororesins soluble in organic solvents) is dissolved in an appropriate solvent, by laminating a beforehand prepared sheet as the protective layer (e.g., a film of organic polymer such as polyethylene terephthalate) on the phosphor layer with an adhesive, or by depositing vapor of inorganic compounds on the phosphor layer. Various additives may be contained in the protective layer. Examples of the additives include light-scattering fine particles (e.g., particles of magnesium oxide, zinc oxide, titanium dioxide and alumina), a slipping agent (e.g., powders of perfluoroolefin resin and silicone resin) and a crosslinking agent (e.g., polyisocyanate). The protective layer generally has a thickness of about 0.1 to 20 μm if it is made of polymer material.

For enhancing the resistance to stain, a fluororesin layer may be provided on the protective layer. The fluororesin layer can be formed by coating the surface of the protective layer with a solution in which a fluororesin is dissolved (or dispersed) in an organic solvent, and then by drying the coated solution. The fluororesin may be used singly, but a mixture of the fluororesin and a film-forming resin is normally employed. In the mixture, an oligomer having polysiloxane structure or perfluoro-alkyl group can be further added. In the fluororesin layer, fine particle filler may be incorporated to reduce blotches caused by interference and thereby to improve quality of the resultant image. The thickness of the fluororesin layer generally is in the range of 0.5 to 20 μm. For forming the fluororesin layer, additives such as a crosslinking agent, a film-hardening agent and an anti-yellowing agent can be used. In particular, the crosslinking agent is advantageously employed to improve durability of the fluororesin layer.

In the way described above, the radiation image storage panel of the invention can be manufactured. In the radiation image storage panel of the invention, the aforementioned colorant may be contained not only in the phosphor layer but also in other layers such as the protective layer and the undercoating layer. Further, the storage panel of the invention may be in known various structures. For example, another phosphor layer comprising a phosphor which absorbs radiation and instantly emits ultraviolet or visible light (namely, a layer of radiation-absorbing phosphor) may be provided. Examples of that phosphor include phosphors of $LnTaO_4$: (Nb, Gd) type, $Ln_2SiO_5$:Ce type, LnOX:Tm type (Ln is a rare earth element) and CsX (X is a halogen) type; $Gd_2O_2S$:Tb; $Gd_2O_2S$:Pr,Ce; $ZnWO_4$; $LuAlO_3$:Ce; $Gd_3Ga_5O_{12}$:Cr,Ce; and $HfO_2$.

EXAMPLE 1

| Step (1): Formation of undercoating layer | | |
|---|---|---|
| Resin: | soft acrylic resin (CRYSCOAT P-1018GS [21% toluene solution], available from Dainippon Ink & Chemicals, Inc.) | 3,700 g |
| Electroconductive particles: | ZnO whiskers (PANATETRA A-1-1, available from Matsushita Amtec Co., Ltd.) | 190 g |
| Hardening Agent: | polyisocyanate (Z-4470 [70% solution dissolved in methoxypropyl acetate-xylene mixed solvent], available from Sumitomo Bayern Urethane, Inc.] | 40 g |

The above-identified materials were added placed in methyl ethyl ketone (MEK), and mixed and dispersed by means of a disperser to prepare a coating solution having a viscosity of 0.8 Pa·s (20° C.). Before placed in MEK, the electro-conductive particles were beforehand dispersed with a ball mill. The coating solution was then evenly spread on a support (carbon-containing polyethylene terephthalate sheet of 188 μm thickness, X-30, available from Toray industries Co., Ltd.), and dried to form an undercoating layer (thickness: 10 μm).

| Step (2): Formation of energy-storing phosphor layer | | |
|---|---|---|
| Energy-storing phosphor: | BaF(Br$_{0.85}$I$_{0.15}$): Eu$^{2+}$ stimulable phosphor particles (median diameter: 3.5 μm) | 1,000 g |
| Binder: | polyurethane elastomer (PANDEX T-5265H [solid], available from Dainippon Ink & Chemicals, Inc.) | 36 g |
| Colorant: | ultramarine [SM-3, available from Daiichi Chemical Industry Co.,, Ltd.] | 1.8 g |
| Hardening Agent: | polyisocyanate [COLONATE HX (solid content: 100%), available from Nippon Polyurethane Co., Ltd.] | 3.3 g |
| Anti-yellowing | epoxy resin [EPIKOTE #1001 (solid), available from Yuka Shell Epoxy Co., Ltd.] | 10 g |

The above-mentioned materials were placed in a mixed solvent of MEK/butyl acetate, and mixed and dispersed by means of a propeller mixer at the propeller rotation rate of 2,500 rpm for 1 hour, to prepare a phosphor dispersion having a viscosity of 3.5 Pa·s (25° C.). Before added to the mixed solvent, the colorant was dispersed with a ball mill in the solvent in which a portion of the binder had been beforehand dissolved. The phosphor dispersion was then evenly spread on the undercoating layer to form a phosphor layer (thickness: 130 μm).

The formed phosphor layer was then heated and compressed (hot-pressed) with a calendering machine [total load: 50 MPa, temperature of upper roller: 73° C., temperature of lower roller: 85° C., transferring speed: 1.0 m/minute]. The thickness of the hot-pressed phosphor layer was 118 μm, and the packing density of the phosphor in the phosphor layer was 3.1 g/cm$^3$.

Step (3): Formation of Protective Layer

One side of a polyethylene terephthalate (PET) film (thickness: 9 μm) was coated with an unsaturated polyester resin solution (BYRON 30SS, available from Toyobo Co., Ltd.) and dried to form an adhesive layer (coated amount: 2 g/m$^2$). The coated PET film was placed on the phosphor layer under the condition that the adhesive layer would be in contact with the phosphor layer, and hot-pressed by means of a laminating roll, to provide a protective layer. The protective layer was then processed with an embossing roll, to form fine concaves and convexes on the surface of the protective layer.

Step (4): Formation of Support-Backing Layer and Fringe of Sealant

One side of a stretched polypropylene (PP) film (thickness: 25 μm) was coated with an unsaturated polyester resin solution (BYRON 30SS, available from Toyobo Co., Ltd.) and dried to form an adhesive layer (applied amount: 3 g/m$^2$). The coated PP film was placed on the support (on the side opposite to the side where the phosphor layer and the protective layer were provided) under the condition that the adhesive layer would be in contact with the support, and hot-pressed by means of a laminating roll, to provide a backing layer. The obtained laminate was stamped out with a punching cutter (a pair of male cutter and female cutter), and thereby made to be in a predetermined size. On the protective layer of the size-adjusted laminate, the above-mentioned resin solution was applied to form a frame, and dried to form a fringe of sealant (width: 0.5 to 1 mm).

Thus, a radiation image storage panel of the invention comprising a backing layer, a support, an undercoating layer, an energy-storing phosphor layer and a protective layer, laminated in order was produced. The produced storage panel was framed in a fringe of sealant.

EXAMPLE 2

| Step (1): Formation of undercoating layer | | |
|---|---|---|
| Resin: | soft acrylic resin (CRYSCOAT P-1018GS [21% toluene solution], available from Dainippon Ink & Chemicals, Inc.) | 3,400 g |
| Plasticizer: | phthalic acid ester (#10, available from Daihachi Chemical Industry Co.,, Ltd.) | 120 g |
| Electroconductive particles: | ZnO whiskers (Panatetra A-1-1, available from Matsushita Amtec Co., Ltd.) | 240 g |
| Colorant: | ultramarine [SM-1, available from Daiichi Chemical Industry Co.,, Ltd.] | 10 g |

The above-mentioned materials were placed in methyl ethyl ketone (MEK), and mixed and dispersed by means of a disperser to prepare a coating solution having a viscosity of 0.6 Pa·s (20° C.). Before placed in MEK, the electro-conductive particles and the colorant were dispersed with a ball mill in the solvent in which a portion of the binder had been beforehand dissolved. The coating solution was then evenly spread on a support (carbon-containing polyethylene terephthalate sheet of 188 μm thickness, X-30, available from Toray industries Co., Ltd.), and dried to form an undercoating layer (thickness: 20 μm).

| Step (2): Formation of energy-storing phosphor sheet | | |
|---|---|---|
| Energy-storing phosphor: | BaF(Br$_{0.85}$I$_{0.15}$): Eu$^{2+}$ stimulable phosphor particles (median diameter: 3.5 μm) | 1,000 g |
| Binder: | polyurethane elastomer (Pandex T-5265H [solid], available from Dainippon Ink & Chemicals, Inc.) | 36 g |
| Colorant: | ultramarine [SM-3, available from Daiichi Chemical Industry Co.,, Ltd.] | 2 g |
| Hardening Agent: | polyisocyanate [Colonate HX (solid content: 100%), available from Nippon Polyurethane Co., Ltd.] | 4 g |
| Anti-yellowing agent: | epoxy resin [EPIKOTE #1001 (solid), available from Yuka Shell Epoxy Co., Ltd.] | 10 g |

The above-mentioned materials were placed in a mixed solvent of MEK/butyl acetate, and mixed and dispersed by means of a propeller mixer at the propeller rotation rate of 2,500 rpm for 1 hour, to prepare a phosphor dispersion having a viscosity of 4.0 Pa·s (25° C.). Before placed in the mixed solvent, the colorant was dispersed with a ball mill in the solvent in which a portion of the binder had been beforehand dissolved. The phosphor dispersion was then evenly spread on a temporary support (polyethylene terephthalate sheet coated with a silicone releasing agent, thickness: 180 μm), dried, and then peeled off to obtain a phosphor sheet (thickness: 150 μm).

Step (3): Formation of Energy-Storing Phosphor Layer

The above-prepared phosphor sheet was placed on the undercoating layer having been provided on the support so that the bottom (surface having been in contact with the temporary support in preparation) of the phosphor sheet might be in contact with the undercoating layer. The formed laminate was then continuously heated and compressed (hot-pressed) with a calendering machine [total load: 60 Mp, temperature of rollers: 55° C., transferring speed: 1.0 m/minute]. As a result, the phosphor sheet was completely combined with the support via the undercoating layer, to provide a phosphor layer. The thickness of the phosphor layer thus subjected to the heat-compression (hot-press) treatment was 117 μm, and the packing density of the phosphor in the phosphor layer was 3.3 g/cm$^3$.

Step (4): Formation of Protective Layer

One side of a polyethylene terephthalate (PET) film (thickness: 6 μm) was coated with an unsaturated polyester resin solution (BYRON 30SS, Toyobo Co., Ltd.) and dried to form an adhesive layer (coated amount: 2 g/m$^2$). The treated PET film was placed on the phosphor layer so that the adhesive layer might be in contact with the phosphor layer, and hot-pressed by means of a laminating roll, to provide a protective layer. The protective layer was then treated with an embossing roll, to form fine concaves and convexes on the surface of the protective layer.

Step (5): Formation of Support-Backing Layer and Fringe of Sealant

One side of a stretched polypropylene (PP) film (thickness: 25 μm) was coated with an unsaturated polyester resin solution (BYRON 30SS, Toyobo Co., Ltd.) and dried to form an adhesive layer (coated amount: 3 g/m$^2$). The thus-treated PP film was placed on the support (on the side opposite to the side where the phosphor layer and the protective layer were provided) under the condition that the adhesive layer would be in contact with the support, and hot-pressed by means of a laminating roll, to provide a backing layer. The prepared laminate was stamped out with a punching cutter (a pair of male cutter and female cutter), and thereby made to be in a proper size. On the protective layer of the size-adjusted laminate, the above-mentioned resin solution was applied in the form of a frame and dried to form a fringe of sealant (width: 0.5 to 1 mm).

Thus, a radiation image storage panel of the invention comprising a backing layer, a support, an undercoating layer, an energy-storing phosphor layer and a protective layer, laminated in this order was produced. The produced storage panel was framed in a fringe of sealant.

COMPARISON EXAMPLE 1

The procedures of Example 1 were repeated except that the phosphor layer was not subjected to the heat-compression (hot-press) treatment in Step (2), to produce a radiation image storage panel for comparison.

COMPARISON EXAMPLE 2

The procedures of Example 2 were repeated except for the following, to produce another radiation image storage panel for comparison.

Step (2): As the colorant, 0.15 g of ultramarine was used to prepare a phosphor sheet.

Step (3): The phosphor sheet was laminated on the undercoating layer without using the calendering machine, to provide a phosphor layer.

Step (4): As the protective layer, a PET film (thickness: 9 μm) was used.

Evaluation of Radiation Image Storage Panels

With respect to each produced storage panel, the absorbance was measured in the following manner. Further, the produced storage panels were evaluated in respect of the sharpness and the scratch resistance.

(1) Absorbance

The absorbance of each storage panel was measured by means of a spectrophotometer (U-3310, manufactured by HITACHI, Ltd.) equipped with an integrating sphere of 150φ (manufactured by HITACHI, Ltd.). In the measurement, the absorbance is determined with an alumina-made white board as a reference. First, the absorbance of the panel surface (surface of the protective layer) at the stimulating wavelength (650 nm) [absorbance A] and that at the emission wavelength (400 nm) [absorbance B] were measured to determine the ratio A/B [ratio of the absorbance measured at 650 nm to that measured at 400 nm]. The storage panel was then sliced (namely, cut parallel to the layers) with a razor at the depth of approx. 20 μm above the undercoating layer, to bare a horizontal section (inner section) of the phosphor layer. The absorbance of the thus-bared section [absorbance C] was measured in the above manner, to determine the ratio A/C [ratio of the absorbance of the surface to that of the section of the phosphor layer].

(2) Sharpness

Each radiation image storage panel was exposed through a MTF chart to X-rays [emitted from a tungsten tube, voltage: 70 kVp, 2.58×10$^{-5}$ C/kg (100 mR)], and then a semi-conductor laser beam (wavelength: 650 nm) was applied so that the stimulation energy on the panel surface would reach 4.3 J/m$^2$. The stimulated emission (400 nm) given off from the panel surface was collected with a detector (photomultiplier, S-5), and converted into electric signals. The X-rays were applied so much that structure noise was predominant. The obtained electric signals were processed by an image reproducing apparatus to reproduce an image on a display. From the reproduced image, the MTF (%) at the spatial frequency of 1 p/mm was measured to determine the sharpness.

(3) Scratch Resistance

The surface of each storage panel was scratched with a needle having a ball at the end (diameter of ball: 0.3 mm φ) moving at 1 cm/second. The weight loaded on the needle was changed in the range of 0 to 100 gf. From the treated storage panel, a radiation image was reproduced in the above manner. The reproduced image was observed to determine the least loading weight (gf) that gave scratches causing viewable arcifacts, and thereby the scratch resistance of each storage panel was evaluated. The larger the least loading weight is, the better scratch resistance the storage panel has.

The results are set forth in Tables 1 and 2.

TABLE 1

| Ex. | Amount of ultramarine[1] | Thickness of protective layer | Absorbance of panel surface[2] |
|---|---|---|---|
| Ex. 1 | 180 mg | 9 μm | 0.23 |
| Ex. 2 | 200 mg | 6 μm | 0.32 |
| Com. 1 | 180 mg | 9 μm | 0.21 |
| Com. 2 | 15 mg | 9 μm | 0.08 |

Remarks:
[1] based on 100 g of the phosphor
[2] measured at 650 nm

TABLE 2

| Ex. | Packing density | Absorbance ratio A/B[3] | Absorbance ratio A/C[4] | Sharpness (MTF) | Scratch resistance[5] |
|---|---|---|---|---|---|
| Ex. 1 | 3.1 g/cm$^3$ | 5.0 | 1.2 | 83% | 61 gf |
| Ex. 2 | 3.3 g/cm$^3$ | 6.0 | 1.8 | 83% | 66 gf |
| Com. 1 | 2.9 g/cm$^3$ | 3.8 | 1.2 | 83% | 33 gf |
| Com. 2 | 2.9 g/cm$^3$ | 1.6 | 1.7 | 79% | 48 gf |

Remarks:
[3] ratio of the absorbance measured at 650 nm to that measured at 400 nm
[4] ratio of the absorbance of the surface to that of the horizontal section of the phosphor layer
[5] the least loading weight that gave scratches causing viewable arcifacts As is evident from the results set forth in Tables 1 and 2, each radiation image storage panel of the invention (Examples 1 and 2), in which the panel surface showed an absorbance of 0.2 or more at the stimulating wavelength and the packing density of the phosphor was 3.0 g/cm$^3$ or more, gave an image of higher sharpness and had better scratch resistance than the conventional storage panel (Comparison Example 2). The storage panel of Example 2, in which the panel surface showed an absorbance of 0.25 and the packing density was 3.3 g/cm$^3$ or more, is particularly excellent in the scratch resistance. In contrast, the panel of Comparison Example 1, in which the packing density was 2.9 g/cm$^3$ though the absorbance of the panel surface was 0.21, had very poor scratch resistance although giving an image of high sharpness.

What is claimed is:

1. A radiation image storage panel which comprises a phosphor layer containing an energy-storing phosphor, wherein the storage panel has a surface showing an absorbance of 0.2 to 0.5 at the stimulating wavelength of the phosphor, and the phosphor layer contains the phosphor therein at a packing density of 3.0 g/cm$^3$ or more.

2. The radiation image storage panel of claim 1, wherein the surface of the storage panel shows absorbances A and B at the stimulating wavelength and at the emission wavelength of the energy-storing phosphor, respectively, under the condition that the ratio A/B is 4.0 or more.

3. The radiation image storage panel of claim 2, wherein the ratio A/B is 4.5 or more.

4. The radiation image storage panel of claim 2, wherein the surface of the storage panel shows an absorbance of 0.25 to 0.5 at the stimulating wavelength, and the packing density of the phosphor in the phosphor layer is 3.3 g/cm$^3$ or more.

5. The radiation image storage panel of claim 1, wherein the surface of the storage panel shows an absorbance of 0.25 to 0.5 at the stimulating wavelength, and the packing density of the phosphor in the phosphor layer is 3.3 g/cm$^3$ or more.

6. The radiation image storage panel of claim 1, wherein the phosphor layer contains a colorant.

7. The radiation image storage panel of claim 6, wherein the colorant is a ultramarine pigment.

8. The radiation image storage panel of claim 1, wherein the storage panel has a protective layer having a thickness of 1 to 20 μm on the phosphor layer.

9. The radiation image storage panel of claim 1, wherein the energy-storing phosphor is in the form of particles having a median diameter of 1.5 to 6.0 μm.

10. The radiation image storage panel of claim 1, wherein the phosphor layer has a thickness of 30 to 150 μm.

11. The radiation image storage panel of claim 1, wherein the phosphor layer is hardened by a hardening agent.

* * * * *